(12) United States Patent
Barnhart et al.

(10) Patent No.: US 7,376,077 B2
(45) Date of Patent: May 20, 2008

(54) DATA MONITORING AND RECOVERY (75) Inventors: Randy C. Barnhart, Parker, CO (US); Donald V. Schnaidt, Centennial, CO (US); Melinda C. Milani, Parker, CO (US); Jeffrey B. Schreiber, Denver, CO (US)

(73) Assignee: Raytheon Company, Waltham, VA (US)

( * ) Notice: Subject to any disclaimer, the term of this patent is extended or adjusted under 35 U.S.C. 154(b) by 942 days.

(21) Appl. No.: 10/822,606

(22) Filed: Apr. 12, 2004

(65) Prior Publication Data

US 2005/0226143 A1 Oct. 13, 2005

(51) Int. Cl.
G01R 31/08 (2006.01)
G06F 11/00 (2006.01)
G08C 15/00 (2006.01)

(52) U.S. Cl. ............... 370/216; 370/316; 370/389; 370/469; 370/466

(58) Field of Classification Search ............ 370/216, 370/316, 389, 469, 466; 455/8, 10, 12.1
See application file for complete search history.

(56) References Cited

U.S. PATENT DOCUMENTS 6,301,231 B1 * 10/2001 Hassan et al. ............ 370/316
6,608,589 B1    8/2003 Devereux et al. ....... 342/357.06

OTHER PUBLICATIONS

Webb et al., "The WARP: Wideband Advanced Recorded Processor for the New Millennium Program EO-1," Aerospace Conference 1997, Proceedings, IEEE, vol. 4, Feb. 1, 1997, pp. 471-488.

Smith, J.F., "Packet Communications Services for the Space Station Freedom," McDonnel Douglas Space Systems Company, Feb. 4, 1990, pp. 193-200.

Marr, J., "Performing the Galileo Mission Using the S-Band Low-Gain Antenna," Aerospace Applications Conference, 1994, pp. 145-183.

Notification of Transmittal of the International Search Report or the Declaration (PCT Rule 44.1) mailed Jun. 6, 2005 (6 pages) re International Application No. PCT/US2005/012315.

Written Opinion of the International Searching Authority, (PCT Rule 43 bis. 1) mailed Jun. 6, 2005 (8 pages) re International Application No. PCT/US2005/012315.

Barnhardt et al., U.S. Patent Application, entitled "Data Handling in a Distributed Communication Network," U.S. Appl. No. 11/083,380, filed Mar 18, 2005.

* cited by examiner

Primary Examiner—Benny Q. Tieu
Assistant Examiner—Ramtin Kangarloo
(74) Attorney, Agent, or Firm—Baker Botts L.L.P.

(57) ABSTRACT

In one embodiment, a method for DMR includes generating first tracking reports of first data units received at one or more receptors from one or more remote units, generating second tracking reports of first data units received at one of one or more centrals, and generating delivery reports of second data units extracted at the central from the first data units received at the central. The method includes, using the delivery reports, identifying missing second data units that should have been received at the central, but were not. The method includes, using one or more of the tracking reports, mapping the missing second data units to one or more first data units and determining a best source for retransmission of the first data units mapped to the missing second data units. The method includes generating a retransmit request for the first data units mapped to the missing second data units and communicating the retransmit request to the best source.

29 Claims, 3 Drawing Sheets

DATA MONITORING AND RECOVERY

GOVERNMENT FUNDING

The U.S. Government may have certain rights in this invention as provided for by the terms of Contract No. 69792CDE9H awarded by National Polar-Orbiting Operational Environmental Satellite System (NPOESS) Integrated Program Office (IPO).

TECHNICAL FIELD OF THE INVENTION

This invention relates generally to data communication and more particularly to data monitoring and recovery (DMR).

BACKGROUND

In a typical system for data communication according to one or more Consultative Committee for Space Data Systems (CCSDS) protocols, data is received from one or more data sources (such as one or more spacecraft) and processed at a single facility (and possibly a backup facility). The data is then communicated to one or more end users, where it can be processed further, according to particular needs. The system provides only limited access to the data sources, and data latency in the system is often a problem. To facilitate greater reliability and data availability in the system, expensive manual efforts are usually required. In addition, if data is not stored at multiple points along the data path through the system, recovery of lost or corrupted data may not always be possible. Even if data is stored at multiple points along the data path through the system, expensive manual efforts are usually required to identify and recover missing data.

SUMMARY OF THE INVENTION

According to the present invention, disadvantages and problems associated with data communication and data processing over distributed processing sites may be reduced or eliminated.

In one embodiment, a method for DMR includes generating first tracking reports of first data units received at one or more receptors from one or more remote units, generating second tracking reports of first data units received at one of one or more centrals, and generating delivery reports of second data units extracted at the central from the first data units received at the central. The method includes, using the delivery reports, identifying missing second data units that should have been received at the central, but were not. The method includes, using one or more of the tracking reports, mapping the missing second data units to one or more first data units and determining a best source for retransmission of the first data units mapped to the missing second data units. The method includes generating a retransmit request for the first data units mapped to the missing second data units and communicating the retransmit request to the best source.

Particular embodiments of the present invention may provide one or more technical advantages. Particular embodiments may facilitate DMR in a system for communicating data according to one or more CCSDS protocols. Particular embodiments may, in a communication system providing more or less real-time data communication, facilitate DMR without reducing a rate of communication through the communication system. Particular embodiments may provide reliable delivery of CCSDS-encoded, high-rate (such as between approximately twenty-five Mbps and 300 Mbps) data from multiple collection sites to multiple processing facilities. Particular embodiments may be substantially reliable and support high data-availability requirements. Particular embodiments may, in near real time, monitor raw data capture status, intermediate processing status, and product delivery status. Particular embodiments may facilitate automatic recovery of lost data in a timely manner. Particular embodiments may automatically select an optimal point in a data flow to retrieve lost data. Particular embodiments may provide near one hundred percent data availability. Particular embodiments may report statistics on missing data, delivered data, and recovered data.

Certain embodiments may provide all, some, or none of these technical advantages. Certain embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
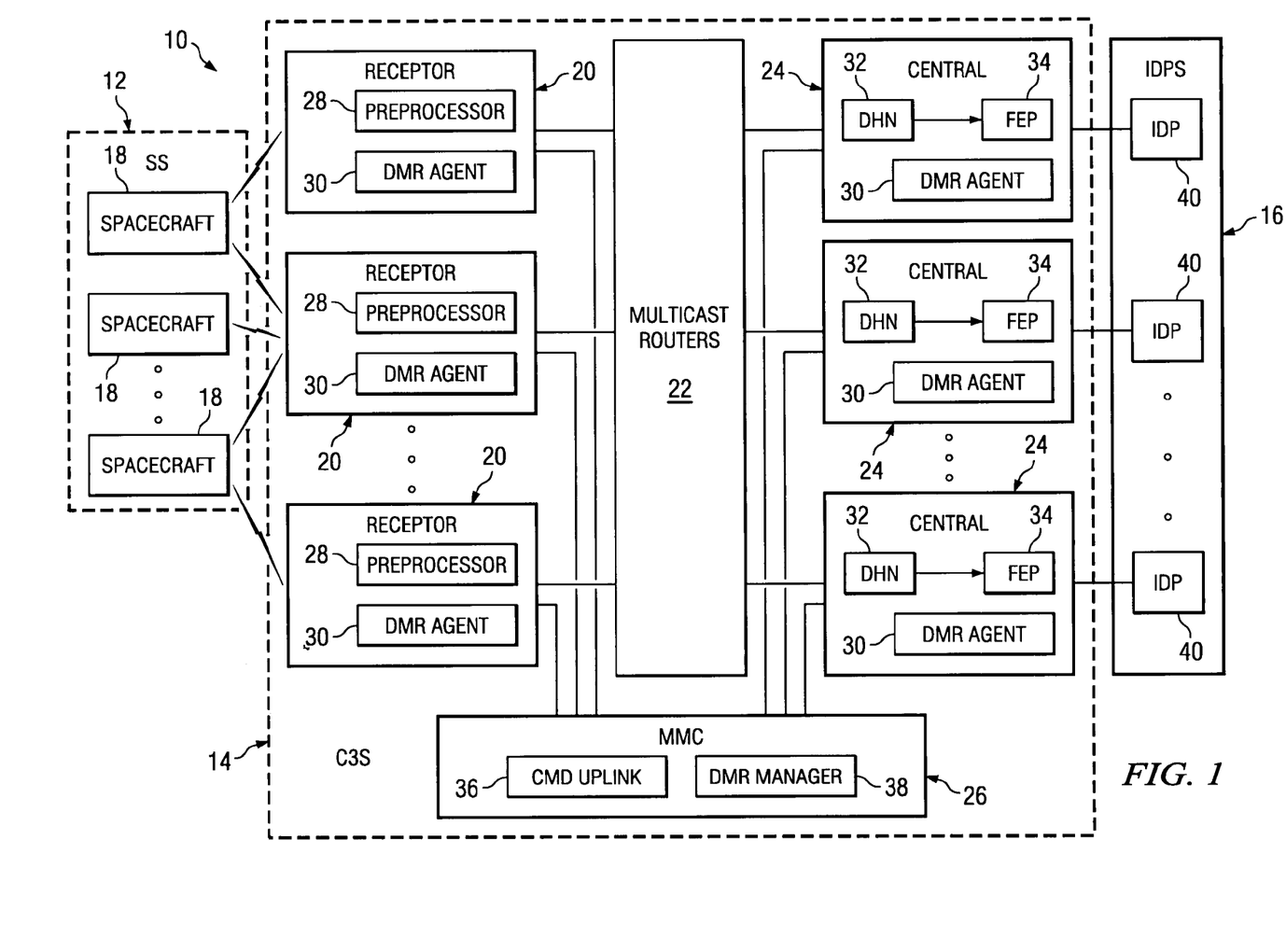
FIG. 1 illustrates an example system for data communication.

FIG. 1 illustrates an example system 10 for data communication. System 10 includes a space segment (SS) 12; a command, control, and communication segment (C3S) 14; and an interface data processor segment (IDPS) 16. SS 12 may include one or more spacecraft 18 that each include one or more sensors. A sensor on a spacecraft 18 may generate data based on information (such as one or more earth weather readings or other information) collected at the sensor. Spacecraft 18 may store data generated at one or more sensors on spacecraft 18 for communication from spacecraft 18 to one or more receptors on the ground, as described below. In particular embodiments, spacecraft 18 may automatically communicate data generated at one or more sensors on spacecraft 18 to one or more receptors on a continuous basis, on a periodic basis, or in response to one or more particular events, according to particular needs. In particular embodiments, spacecraft 18 may communicate such data to one or more receptors in response to particular instructions. Such instructions may include one or more instructions (such as one or more retransmit requests or other instructions) from a mission management center (MMC) in C3S 14. One or more spacecraft 18 may be National Polar-Orbiting Operational Environmental Satellite System (NPOESS) spacecraft 18, and one or more spacecraft 18 may be NPOESS Prepatory Project (NPP) spacecraft 18. Although a particular number of particular spacecraft 18 having particular sensors are described and illustrated, the present invention contemplates any suitable number of any suitable spacecraft 18 having any suitable sensors.

Data generated at a particular sensor of a spacecraft 18 may be organized into application packets (APs) according to one or more suitable CCSDS protocols. In particular embodiments, an AP may include an AP sequence value and an AP identification (APID) value. The AP sequence value may indicate an order of the AP in a particular series of APs, and the APID value may indicate which sensor on which spacecraft 18 generated the AP and identify an AP stream. As an example and not by way of limitation, consider first, second, and third APs from a particular sensor on a particular spacecraft 18. The first AP was generated before the second AP, and the second AP was generated before the third AP. The first AP includes a first AP sequence value that indicates that the first AP was generated before the second AP, the second AP includes a second AP sequence value that indicates that the second AP was generated after the first AP and before the third AP, and the third AP includes a third AP sequence value that indicates that the third AP was generated after the second AP. In addition, the first, second, and third APs each include an APID that indicates that the AP was generated by the particular sensor on spacecraft 18 and identifies a particular AP stream corresponding to the APs.

C3S 14 may include one or more receptors 20, one or more multicast routers 22, one or more centrals 24 (which may each include a data processing center), and an MMC 26. The components of C3S 14 may be coupled to each other using one or more links that may each include one or more computer buses, local area networks (LANs), metropolitan area networks (MANs), wide area networks (WANs), portions of the Internet, or any other appropriate wireline, optical, wireless, or other links. Receptors 20 may receive data from spacecraft 18 and communicate the data to multicast routers 22 for routing to centrals 24. Although multicast routers 22 are described and illustrated, the present invention contemplates data being communicated from spacecraft 18 to centrals 24 according to a multicast protocol, a unicast protocol, or other suitable transfer protocol, according to particular needs. A receptor 20 may communicate with one or more spacecraft 18 using one or more satellite links. In particular embodiments, one or more receptors 20 in C3S 14 may be more or less unmanned. In particular embodiments, one or more receptors 20 in C3S 14 may include a manned ground station. A receptor 20 that includes a manned ground station may be more expensive to operate than a receptor 20 that is more or less unmanned.

Receptors 20 may be globally distributed. As an example and not by way of limitation, C3S 14 may include a first receptor 20 in McMurdo, Antarctica; a second receptor 20 in Santiago, Chile; a third receptor 20 in Pearl City, Hi.; a fourth receptor 20 in Seoul, South Korea; a fifth receptor 20 in San Diego, Calif.; a sixth receptor 20 in Auckland, New Zealand; a seventh receptor 20 in Anchorage, Ak.; an eighth receptor 20 in Bombay, India; a ninth receptor 20 in Nimitz Hill, Guam; a tenth receptor 20 in Orlando, Fla.; an eleventh receptor 20 in Johannesburg, South Africa; a twelfth receptor 20 in Sao Paulo, Brazil; a thirteenth receptor 20 in Melbourne, Australia; a fourteenth receptor 20 in Helsinki, Finland; a fifteenth receptor 20 in Frankfurt, Germany; a sixteenth receptor 20 in Svalbard, Sweden; and a seventeenth receptor 20 in Fairbanks, Ak. In particular embodiments, one or more particular receptors 20 in C3S 14 may communicate only with NPOESS spacecraft 18. In particular embodiments, one or more particular receptors in C3S 14 may communicate only with NPP spacecraft 18.

A spacecraft 18 may communicate an AP to one or more receptors 20 in C3S 14 in one or more virtual channel data units (VCDUs) of 1020 bytes each. A VCDU may be formatted according to one or more suitable CCSDS protocols. Spacecraft 18 may communicate each of the VCDUs to the one more receptors in a channel access data unit (CADU) of 1024 bytes. A CADU may include an encoded VCDU, approximately four bytes for frame synchronization, and one hundred twenty-eight bits for error correction (which may include Reed-Solomon error correction) for decoding the encoded VCDU. A CADU may be formatted according to one or more suitable CCSDS protocols. When a receptor 20 receives a CADU from spacecraft 18, receptor 20 may extract a VCDU from the CADU, add an extension to the VCDU to generate an extended VCDU (EVCDU), and communicate the EVCDU to multicast routers 22 for routing to centrals 24. The extension in the EVCDU may include metadata that one or more components of system 10 may use to track the EVCDU through system 10. Reference to a VCDU may encompass a VCDU, an EVCDU, or both where appropriate. Reference to an EVCDU may encompass an EVCDU, a VCDU, or both, where appropriate.

A link between a spacecraft 18 and a receptor 20 may include one or more virtual channels (VCs) from spacecraft 18 to receptor 20, and a stream of VCDUs may be communicated from spacecraft 18 to receptor 20 in each of the VCs. In particular embodiments, a VCDU may include a VCDU sequence value and a VCID value. The VCDU sequence value may indicate an order of the VCDU in a particular series of VCDUs, and the VCID value may indicate the VC of the VCDU. As an example and not by way of limitation, consider first, second, and third VCDUs in a particular VC. The first VCDU was generated before the second VCDU, and the second VCDU was generated before the third VCDU. Therefore, the first VCDU includes a first VCDU sequence value that indicates that the first VCDU was generated before the second VCDU, the second VCDU includes a second VCDU sequence value that indicates that the second VCDU was generated after the first VCDU and before the third VCDU, and the third VCDU includes a third VCDU sequence value that indicates that the third VCDU was generated after the second VCDU. In addition, the first, second, and third VCDUs each include a VCID that indicates that the VCDU corresponds to the particular VC. In particular embodiments, system 10 may accommodate up to sixty-four different VCs and 2048 different APIDs.

A receptor 20 may include one or more receivers (such as one or more antennae) for receiving data from one or more spacecraft 18. In addition, receptor 20 may include a preprocessor 28 and a DMR agent 30. In particular embodiments, preprocessor 28 may extract VCDUs from CADUs received at receptor 20 and add extensions to the VCDUs to generate EVCDUs. In addition, in particular embodiments, preprocessor 28 may also decode data from spacecraft 18, synchronize frames of data from spacecraft 18, and correct errors in data from spacecraft 18 according to a Reed-Solomon or other error correction technique. In particular embodiments, preprocessor 28 may generate a log file of EVCDUs generated at preprocessor 28 and communicate the EVCDU log file to DMR agent 30 at receptor 20. As an alternative, in particular embodiments, DMR agent 30 may itself access stored data at receptor 20 and generate the log file.

DMR agent 30 at receptor 20 may receive EVCDU log files from preprocessor 28, generate tracking statistics from the EVCDU log files, and generate tracking reports for a DMR manager at MMC 26 from the tracking statistics. A tracking report from DMR agent 30 at receptor 20 may identify VCDUs received at receptor 20. In addition, the tracking report may identify VCDUs that should have been received at receptor 20, but were not. As an example and not by way of limitation, the tracking report may indicate that receptor 20 received, in a particular VC, VCDUs having VCDU sequence values 3260 through 3510 and 3690 through 4171. The gap between VCDU sequence values 3510 and 3690 may indicate that receptor 20 should have received, in the particular VC, VCDUs having sequence values 3511 through 3689, but did not.

In particular embodiments, DMR agent 30 at receptor 20 may also respond to retransmit requests from a DMR manager at MMC 26, as described below. Receptor 20 may store EVCDUs generated at receptor 20 from VCDUs received at receptor 20 from one or more spacecraft 18. DMR agent 30 may, in response to a retransmit request from the DMR manager, access particular EVCDUs stored at receptor 20 and communicate the EVCDUs downstream to one or more centrals 24, as described below. Reference to downstream encompasses a general direction of communication from SS 12 to IDPS 16. Receptor 20 may communicate data from one or more spacecraft 18 to multicast routers 22 more or less in real time, and DMR agent 30 may operate outside the more or less real-time data path through receptor 20. As a result, DMR agent 30 may facilitate DMR operations that involve receptor 20 without substantially reducing the rate of data communication through receptor 20.

Multicast routers 22 may include one or more continental U.S. (CONUS) multicast gateway routers or other routers. In particular embodiments, multicast routers 22 may receive EVCDUs from each receptor 20 and, using a multicasting protocol, communicate the EVCDUs to each central 24 so that each central 24 receives EVCDUs from each receptor 20.

A central 24 includes a data processing center. Central 24 may include a data-handling node 32 (DHN), a front-end processor 34 (FEP), and a DMR agent 30. DHN 32 may receive multiple EVCDU streams (each of which may correspond to a particular receptor 20 and a particular spacecraft 18) from multicast routers 22 and combine the EVCDU streams with each other for processing at FEP 34. In particular embodiments, DHN 32 may receive two or more EVCDU streams from one spacecraft 18 via two or more receptors 20. In these embodiments, DHN 32 combines the two or more EVCDU streams with each other in VCDU sequence-value order. Combining the EVCDU streams with each other may include removing redundancies across two or more of the EVCDU streams. As an example and not by way of limitation, consider a VCDU communicated from a spacecraft 18 to two receptors 20. Both receptors 20 may communicate the VCDU to multicast routers 22, and multicast routers 22 may communicate both instances of the VCDU to DHN 32 in central 24. DHN 32 may determine that two instances of the VCDU have been received and remove the redundancy in the data by communicating only one instance of the VCDU to FEP 34 for processing. DHN 32 may also generate log files of EVCDUs received at central 24 and communicate the EVCDU log files to DMR agent 30 at central 24.

FEP 34 may receive EVCDUs from DHN 32, extract APs from the EVCDUs, and communicate the APs to an interface data processor (IDP) in IDPS 16 for back-end processing. In particular embodiments, FEP 34 may add an extension to an AP to generate an extended AP (EAP) before communicating the AP to the IDP. The extension in the EAP may include metadata that one or more components of system 10 may use to track the EAP through system 10 or process the EAP downstream from FEP 34. Reference to an AP may encompass an AP, an EAP, or both, where appropriate. Reference to an EAP may encompass an EAP, an AP, or both, where appropriate. FEP 34 may generate log files of EAPs generated at FEP 34 and communicate the EAP log files to DMR agent 30 at central 24.

DMR agent 30 at central 24 may receive EVCDU log files from DHN 32, generate tracking statistics from the EVCDU log files, and generate tracking reports for a DMR manager at MMC 26 from the tracking statistics. Tracking statistics from DMR agent 30 at central 24 may identify EVCDUs received at central 24. In addition, tracking statistics from DMR agent 30 at central 24 may identify EVCDUs that should have been received at DHN 32, but were not. As an example and not by way of limitation, tracking statistics from DMR agent 30 at central 24 may indicate that central 24 received, in an EVCDU stream, EVCDUs having EVCDU sequence values 3260 through 3510 and 3690 through 4171. The gap between EVCDU sequence values 3510 and 3690 may indicate that central 24 should have received, in the particular EVCDU stream, EVCDUs having sequence values 3511 through 3689, but did not.

DMR agent 30 at central 24 may also receive EAP log files from FEP 34, generate delivery statistics from the EAP log files, and generate delivery reports for a DMR manager at MMC 26 from the delivery statistics. Delivery reports from DMR agent 30 at central 24 may identify EAPs generated at central 24. In addition, delivery reports from DMR agent 30 at central 24 may identify APs that receptor 20 should have received, but did not. As an example and not by way of limitation, a delivery report from DMR agent 30 at central 24 may indicate that central 24 received, in a particular AP stream, APs having AP sequence values thirty-four through thirty-nine and forty-three through fifty. The gap between AP sequence values thirty-nine and forty-three may indicate that central 24 should have received, in the particular AP stream, APs having sequence values forty through forty-two, but did not.

DMR agent 30 at central 24 may also respond to retransmit requests from a DMR manager at MMC 26, as described below. Central 24 may store EVCDUs received at central 24. In particular embodiments, DMR agent 30 may, in response to a retransmit request from the DMR manager, access one or more particular EVCDUs stored at central 24 and communicate the EVCDUs to FEP 34 at central 24 (or another FEP 34 at another central 24), as described below. Central 24 may communicate data from multicast routers 22 to IDPS 16 more or less in real time, and DMR agent 30 may operate outside the more or less real-time data path through central 24. As a result, DMR agent 30 may facilitate DMR operations that involve central 24 without substantially reducing the rate of data communication through central 24.

In particular embodiments, DMR agents 30 may receive and respond to bandwidth-control signals from MMC 26 or other suitable component of C3S 14. Bandwidth-control signals may be used to dynamically control bandwidth used to recover missing data, which may provide more efficient usage of available bandwidth and enable implementation of priorities between first-copy delivered data and retransmitted data.

MMC 26 may include one or more command (CMD) uplinks 36 and a DMR manager 38. In addition, MMC 26 may include an enterprise-management component, and DMR manager 38 may communicate, to the enterprise-management component, information regarding data statistics, retransmission activity, and DMR operational status. A CMD uplink 36 may be used to communicate instructions (such as retransmit requests and other instructions) from MMC 26 to one or more spacecraft 18. CMD uplink 36 may include one or more transmitters and associated hardware, software, or both, for communicating instructions to spacecraft 18. CMD uplink 36 may communicate with a spacecraft 18 using a satellite link. DMR manager 38 may receive tracking reports and delivery reports from DMR agents 30. DMR manager 38 may store tracking reports and delivery reports from DMR managers 30. An open database connectivity (ODBC) or other suitable database may be used to store the tracking and delivery reports. DMR manager 38 may use the delivery reports to identify missing EAPs and map the missing EAPs to particular EVCDUs, as described below. Reference to a missing EAP may encompass an entire EAP, a portion of an EAP, or both, where appropriate. In particular embodiments, DMR manager 38 may compile tracking reports from DMR agents 30 to generate one or more records indicating what EVCDUs have been received at what receptors 20 and what centrals 24 in C3S 14. The records may provide a more or less comprehensive view of activity in C3S 14 with respect to the communication of stored mission data (SMD) from SS 12 to IDPS 16. Reference to tracking reports may encompass such records, and vice versa, where appropriate.

DMR manager 38 may use tracking reports to identify one or more components of system 10 that have stored copies of EVCDUs mapped to missing EAPs. As an example, DMR manager 38 may receive a delivery report from a first DMR agent 30 at a first central 24 that indicates that (1) an FEP 34 at first central 24 should have received, but did not receive, APs having APID twenty-four and AP sequence values forty through forty-two and (2) the APs having APID twenty-four and AP sequence values forty through forty-two were communicated in EVCDUs having VCID fourteen and VC sequence values 3511 through 3689. DMR manager 38 may identify the missing APs from the delivery report and identify the EVCDUs that need to be retransmitted to recover the missing APs. DMR manager 38 may then access one or more tracking reports from one or more second centrals 24 and one or more receptors 20 to identify one or more components (such as one or more second centrals 24 or one or more receptors 20) of system 10 that have stored copies of the EVCDUs that need to be retransmitted. In particular embodiments, DMR manager 38 may, periodically and without user input, query one or more databases used to store tracking and delivery reports to determine whether one or more FEPs 34 should have received one or more EAPs, but did not. In addition, DMR manager 38 may, periodically and without user input, query the databases to determine what components of C3S 14 have received what EVCDUs, as described above.

DMR manager 38 may then identify, from among the components of system 10 that have stored copies of the EVCDUs, one or more best sources for retransmission of the EVCDUs to first central 24. A best source for retransmission of the EVCDUs may include a component closest to IDPS 16 that has stored copies of the EVCDUs. As an example and not by way of limitation, if a second central 24 has stored copies of the EVCDUs, second central 24 may be a best source for retransmission. If a second central 24 does not have stored copies of the EVCDUs, but a receptor 20 does, receptor 20 may be a best source for retransmission. If neither a second central 24 nor a receptor 20 has stored copies of the EVCDUs, a spacecraft 18 may be a best source for retransmission. If DMR manager 38 determines that one or more particular spacecraft 18 need to retransmit one or more VCDUs, DMR manager 38 may communicate a retransmit request to CMD uplink 36 for communication to spacecraft 18. After DMR manager 38 has identified one or more best sources for retransmission of the EVCDUs to first central 24, DMR manager 38 may communicate a retransmit request to the best sources. If DMR manager 38 communicates the retransmit request to a receptor 20 or a central 24, a DMR agent 30 at receptor 20 or central 24 may respond to the retransmit request, as described above.

In particular embodiments, before generating a new retransmit request, DMR manager 38 may determine whether the new retransmit request would overlap or be at least substantially adjacent a currently pending retransmit request. If so, DMR manager 38 may, instead of generating the new retransmit request, modify the already pending retransmit request to include the new retransmit request. As an example and not by way of limitation, consider a first, currently pending retransmit request to a particular receptor 20 to retransmit, to a particular central 24, EVCDUs having VCID fourteen and EVCDU sequence values 3511 through 3689. While the first retransmit request is pending, DMR manager 38 determines that receptor 20 also needs to retransmit, to central 24, EVCDUs having VCID fourteen and EVCDU sequence values 3690 through 3815. DMR manager 38 may then, instead of generating a second retransmit request, modify the first retransmit request to include EVCDUs having VCID fourteen and EVCDU sequence values 3690 through 3815. In addition, if two or more retransmit requests for missing data from two or more centrals 24 would overlap or be at least substantially adjacent each other such that a single recovery operation could recover the missing data, DMR manager 38 may concatenate the retransmit requests to each other. Concatenating particular retransmit requests to each other may facilitate avoiding multiple recovery operations directed to data that could be recovered in a single recovery operation, which may reduce bandwidth requirements associated with recovery operations in system 10. By concatenating particular retransmit requests to each other, DMR manager 38 effectively controls multicast of retransmitted data. In particular embodiments, DMR agents 30 and DMR manager 32 run automatically and do not require user input from operations personnel.

IDPS 16 may include one or more IDPs 40. An IDP 40 may include one or more stations including hardware, software, or both for back-end processing of data generated at one or more sensors of one or more spacecraft 18. As an example and not by way of limitation, IDP 40 may include one or more stations for interpreting or otherwise making use of information (such as one or more earth weather readings or other information) collected at one or more sensors of one or more spacecraft 18. In particular embodiments, a first IDP 40 may be associated with the National Oceanic and Atmospheric Administration's (NOAA's) National Environmental Satellite, Data, and Information Service (NESDIS); a second IDP 40 may be associated with the U.S. Air Force's Air Force Weather Agency (AFWA); a third IDP 40 may be associated with the U.S. Navy's Feet Numerical Meteorology and Oceanography Center (FN-MOC); and a fourth IDP 40 may be associated with the U.S. Navy's Naval Oceanographic Office (NAVO). First, second, third, and fourth IDPs 16 may each be associated with a particular central 24 in C3S 14. A central 24 may be coupled to an IDP 40 using one or more links that may each include one or more computer buses, LANs, MANs, WANs, portions of the Internet, or any other appropriate wireline, optical, wireless, or other links.

IDPS 16 may communicate with DMR manager 38. In particular embodiments, IDPS 16 may communicate retransmit requests to DMR manager 38. DMR manager 28 may, in response to a first retransmit request from IDPS 16, communicate a request acknowledgement to an IDP 40 in IDPS 16 that generated the retransmit request and cause one or more VCDUs to be retransmitted, as described above. DMR manager 28 may also communicate to IDP 40 information regarding retransmission activity with respect to the retransmit request. To enable communication between DMR manager 38 and one or more IDPs 40 in IDPS 16, MMC 26 may be coupled to IDPS 16 using one or more links that may each include one or more computer buses, LANs, MANs, WANs, portions of the Internet, or any other appropriate wireline, optical, wireless, or other links.

According to one or more CCSDS protocols, multiple APs that are related to each each other may be identified together as a segmented packet set. One or more fields in the headers of those APs may indicate where the APs belong in the segmented packet set. As an example and not by way of limitation, consider a segmented packet set that includes first, second, and third APs. One or more fields in the header of the first AP indicate that the first AP is first in the segmented packet set, one or more fields in the header of the second AP indicate that the second AP is second in the segmented packet set, and one or more fields in the header of the third AP indicate that the third AP is third in the segmented packet set. Since APs may have a maximum size of 64 kilobytes, such fields may facilitate file transfers, sensor scans, memory dumps, and other operations involving more than 64 kilobytes of data.

In particular embodiments, when a missing AP that is part of a segmented packet set is recovered, all other APs that are part of the segmented packet set are also recovered. As an example and not by way of limitation, when DMR manager 38 determines that an AP should have been received at a component in C3S 14, but was not, DMR manager 38 may determine whether the missing AP is part of a segmented packet set. If DMR manager 38 determines that the missing AP is part of a segmented packet set, DMR 38 may identify the other APs in the segmented packet set and include those other APs in the retransmit request for the missing AP. Accordingly, when the missing AP eventually reaches one or more IDPs 40, the missing AP reaches the IDPs 40 along with the other APs in the missing AP's segmented packet set.

Figure 2:
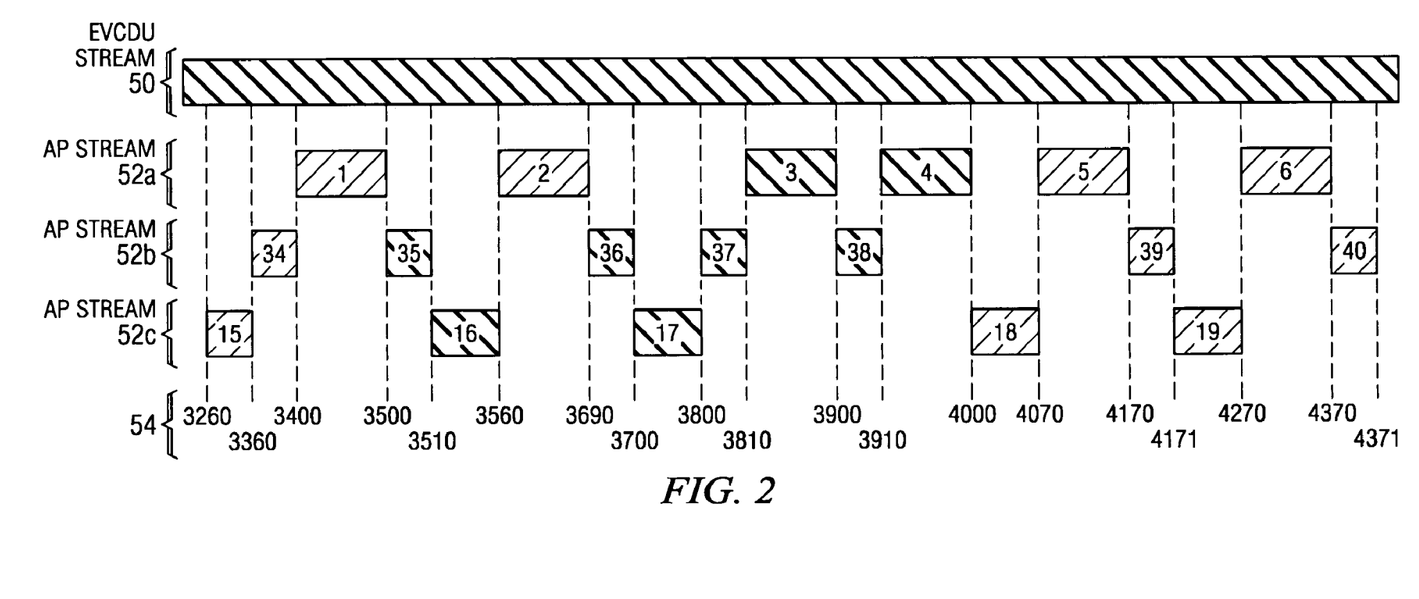
FIG. 2 illustrates example data that may be communicated in the system illustrated in FIG. 1.

FIG. 2 illustrates example data in system 10. EVCDU stream 50 includes three AP streams 52 and has a particular VCID. The EVCDUs in EVCDU stream 50 are sequential EVCDUs that each have an EVCDU sequence value 54. AP stream 52a has a first APID, and the APs in AP stream 52a are sequential APs that each have an AP sequence value. AP stream 52b has a second APID, and the APs in AP stream 52b are sequential APs that each have an AP sequence value. AP stream 52c has a third APID, and the APs in AP stream 52a are sequential APs that each have an AP sequence value. In FIG. 2, APs are generally positioned with respect to EVCDU stream 50 according to the EVCDU sequence values 54 of the EVCDUs that contain the APs. EVCDUs 4070 through 4170 contain AP five of AP stream 52a, EVCDUs 3360 through 3400 contain AP thirty-four of AP stream 52b, EVCDUs 3700 through 3800 contain AP seventeen of AP stream 52c, and so on. Although the boundaries of APs are illustrated and described as lining up with the boundaries of EVCDUs, such boundaries may not necessarily line up with each other. Such boundaries are described and illustrated as lining up with each merely to simplify explanation of the present invention.

DMR manager 38 may receive, from a DMR agent 30 at a central 24, a delivery report indicating that an FEP 34 at central 24 should have received the following APs, but did not: APs three and four of AP stream 52a; APs thirty-five through thirty-eight of AP stream 52b; and AP sixteen and seventeen of AP stream 52c. In addition or as an alternative, DMR manager 38 may receive a retransmit request from one or more IDPs 40 indicating that IDPs 40 should have received the APs, but did not. DMR manager 38 may then access one or more tracking reports from one or more DMR agents 30 to determine what EVCDUs need to be retransmitted to central 24. From the tracking reports, DMR manager 38 may determine that EVCDUs 3500 through 3560 and 3690 through 4000 contain the missing APs and need to be retransmitted. Although retransmit requests from IDPs 40 are described and illustrated, an IDP 40 may, in particular embodiments, rely on DMR manager 38 to detect missing data and request retransmission of the missing data automatically and without IDP 40 requesting such retransmission. An IDP 40 may, however, communicate a retransmit request to DMR manager 38 when IDP 40 initializes after a failure or an operator of IDP 40 manually determines that certain data is missing.

To identify EVCDUs for retransmission, DMR manager 38 may locate gaps in EVCDU stream 50. As an example and not by way of limitation, DMR manager 38 may determine that, with respect to AP stream 52a, FEP 34 received APs two and five without receiving APs three and four. DMR manager 38 may also determine that the end of AP two corresponds to EVCDU 3690 and the start of AP five corresponds to EVCDU 4070. Because APs three and four lie between APs two and five, DMR manager 38 may conclude that EVCDUs 3691 through 4069 contain at least APs three and four. With respect to AP stream 52b, DMR manager 38 may determine that FEP 34 received APs thirty-four and thirty-eight without receiving APs thirty-five through thirty-eight. DMR manager 38 may also determine that the end of AP thirty-four corresponds to EVCDU 3400 and the start of AP thirty-eight corresponds to EVCDU 4170. Because APs thirty-five through thirty-nine lie between APs thirty-four and thirty-nine, DMR manager 38 may conclude that EVCDUs 3401 through 4169 contain at least APs thirty-five through thirty-nine. With respect to AP stream 52c, DMR manager 38 may determine that FEP 34 received APs fifteen and eighteen without receiving APs sixteen and seventeen. DMR manager 38 may also determine that the end of AP fifteen corresponds to EVCDU 3360 and the start of AP eighteen corresponds to EVCDU 4000. Because APs sixteen and seventeen lie between APs fifteen and eighteen, DMR manager 38 may conclude that EVCDUs 3361 through 3999 contain at least APs sixteen and seventeen.

DMR manager 38 may determine that, therefore, there are gaps in EVCDU stream 50 between EVCDUs 3501 through 3559 and between 3691 through 3999 and that those gaps contain the missing APs. DMR manager 38 may then identify one or more components of system 10 that have stored copies of EVCDUs 3501 through 3559 and between 3691 through 3999. DMR manager 38 may access one or more tracking reports stored at DMR manager 38 to make this determination. As described above, DMR manager 38 may use a VCID (in addition to EVCDU sequence values) to identify the EVCDUs. DMR manager 38 may then identify one or more best sources for the EVCDUs and communicate one or more retransmit requests to the best sources for the EVCDUs.

Figure 3:
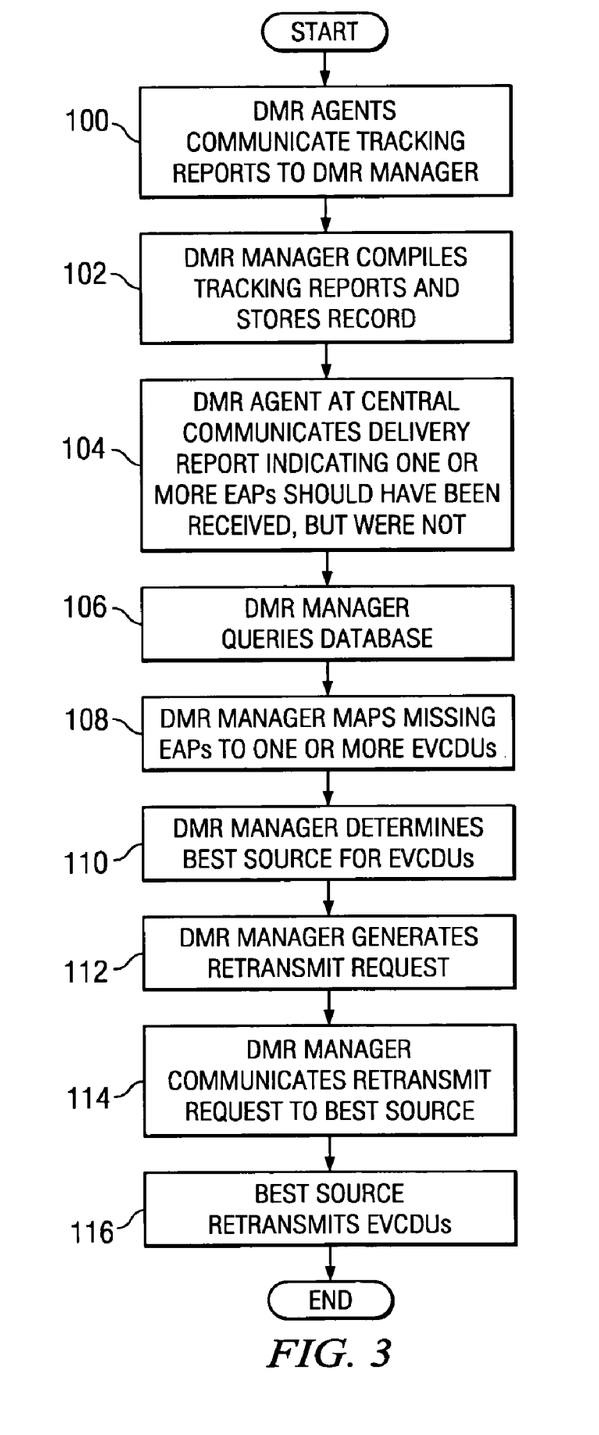
FIG. 3 illustrates an example method for DMR in the system illustrated in FIG. 1.

FIG. 3 illustrates an example method for data monitoring and recover in system 10. The method begins at step 100, where DMR agents 30 communicate tracking reports to DMR manager 38. At step 102, DMR manager 38 compiles the tracking reports and stores the resulting record. At step 104, a DMR agent 30 at a central 24 communicates a delivery report to DMR manager 38 indicating one or more EAPs that an FEP 34 at central should have received, but did not. At step 106, in response to the delivery report, DMR manager 38 runs a database query to map the missing EAPs to one or more EVCDUs and determine a best source for the EVCDUs. In particular embodiments, DMR manager 38 may store delivery reports from DMR agents 30 and, instead of response to individual delivery reports, periodically run queries to determine whether one or more EAPs should have been received at one or more FEPs 34, but were not. If DMR manager 38 determines that one or more EAPs should have been, but were not, received at one or more FEPs 34, DMR manager 38 may then run a database query to map the missing EAPs to one or more EVCDUs and determine a best source for the EVCDUs. As described above, in particular embodiments, DMR manager 38 may run the database query in response to a retransmit from one or more IDPs 40.

At step 108, DMR manager 38, using the results of the database query, maps the missing EAPs to one or more EVCDUs. At step 110, DMR manager 38 determines, from the results of the database query, a best source (which may include another central 24, a receptor 20, or a spacecraft 12) for the EVCDUs mapped to the missing EAPs. At step 112, DMR manager 38 generates a retransmit request for the missing EVCDUs. At step 114, DMR manager 38 communicates the retransmit request to the best source. At step 116, the best source receives the retransmit request and retransmits the EVCDUs to central 24, at which point the method ends. In particular embodiments, as described above, before DMR manager 38 generates a new retransmit request, DMR manager 38 may determine whether the new retransmit request would overlap a currently pending retransmit request. If so, DMR manager 38 may, instead of generating the new retransmit request, modify the already pending retransmit request to include the new retransmit request. The method illustrated in FIG. 3 may be repeated as data is communicated through system 10 from SS 12 to IDPS 16 to recover missing EAPs. Although particular steps of the method illustrated in FIG. 3 have been described and illustrated as occurring in a particular order, the present invention contemplates any suitable steps of the method illustrated in FIG. 3 occurring in any suitable order.

Although the present invention has been described with several embodiments, myriad changes, variations, alterations, transformations, and modifications may be suggested to one skilled in the art, and it is intended that the present invention encompass such changes, variations, alterations, transformations, and modifications as fall within the scope of the appended claims. The present invention is not intended to be limited, in any way, by any statement in the specification that is not reflected in the claims.

What is claimed is:

1. A system for data monitoring and recovery (DMR), the system comprising:
one or more first DMR agents, each first DMR agent residing at one of one or more receptors that are each operable to receive first data units from one or more remote units, the first DMR agent being operable to generate first tracking reports of the first data units received at the receptor and communicate the first tracking reports to a DMR manager;
one or more second DMR agents, each second DMR agent residing at one of one or more centrals that are each operable to receive first data units from one or more receptors and extract second data units from the first data units for communication to one or more interface data processors (IDPs), the second DMR agent being operable to:
generate second tracking reports of the first data units received at the central and communicate the second tracking reports to the DMR manager; and
generate delivery reports of the second data units extracted at the central and communicate the delivery reports to the DMR manager, the delivery reports indicating missing second data units that should have been received at the central, but were not; and
the DMR manager, operable to:
using the delivery reports, identify the missing second data units;
using one or more of the tracking reports:
map the missing second data units to one or more first data units; and
determine a best source for retransmission of the first data units mapped to the missing second data units;
generate a retransmit request for the first data units mapped to the missing second data units; and
communicate the retransmit request to the best source.

2. The system of claim 1, wherein the first data units are virtual channel data units (VCDUs) and the second data units are application packets (APs) defined in one or more Consultative Committee for Space Data Systems (CCSDS) protocols.

3. The system of claim 1, wherein:
if a central has stored copies of the first data units mapped to the missing second data units, the best source is the central;
if no central has stored copies of the first data units mapped to the missing second data units, but a receptor does, the best source is the receptor; and
if no central and no receptor has stored copies of the first data units mapped to the missing second data units, but a remote unit does, the best source is the remote unit.

4. The system of claim 1, wherein the retransmit request comprises a new retransmit request, the DMR manager being operable to:
determine whether the new retransmit request would overlap or be at least substantially adjacent an already pending retransmit request; and
if the new retransmit request would overlap the already pending retransmit request, modify the already pending retransmit request to include the new retransmit request instead of generating the new retransmit request.

5. The system of claim 1, wherein the DMR manager is operable to receive and respond to a retransmit request from one or more IDPs.

6. The system of claim 1, wherein the DMR manager is operable to compile a plurality of tracking reports into a record for mapping missing second data units to first data units and determining best sources for retransmission of first data units mapped to missing second data units.

7. The system of claim 1, wherein the DMR manager, on a periodic basis, runs queries of a database of stored delivery reports to identify missing second data units.

8. The system of claim 1, wherein:
the receptor is operable to:
extract first data units from one or more streams of first data units;
add one or more extensions to the first data units extracted from the streams of first data units;
store first data units received at the receptor for subsequent recovery operations; and generate log files of first data units received at the receptor; and the central comprises a data-handling node (DHN) operable to combine a plurality of streams of first data units with each other.

9. The system of claim 1, wherein the DMR agent and the DMR manager operate outside a substantially real-time data path through the receptor and the central.

10. The system of claim 1, wherein a remote unit is a spacecraft.

11. A method for data monitoring and recovery (DMR), the method comprising:
generating first tracking reports of first data units received at one or more receptors from one or more remote units;
generating second tracking reports of first data units received at one of one or more centrals;
generating delivery reports of second data units extracted at the central from the first data units received at the central;
using the delivery reports, identifying missing second data units that should have been received at the central, but were not;
using one or more of the tracking reports:
mapping the missing second data units to one or more first data units; and
determining a best source for retransmission of the first data units mapped to the missing second data units;
generating a retransmit request for the first data units mapped to the missing second data units; and
communicating the retransmit request to the best source.

12. The method of claim 11, wherein the first data units are virtual channel data units (VCDUs) and the second data units are application packets (APs) defined in one or more Consultative Committee for Space Data Systems (CCSDS) protocols.

13. The method of claim 11, wherein:
if a central has stored copies of the first data units mapped to the missing second data units, the best source is the central;
if no central has stored copies of the first data units mapped to the missing second data units, but a receptor does, the best source is the receptor; and
if no central and no receptor has stored copies of the first data units mapped to the missing second data units, but a remote unit does, the best source is the remote unit.

14. The method of claim 11, wherein:
the retransmit request comprises a new retransmit request; and
the method comprises:
determining whether the new retransmit request would overlap or be at least substantially adjacent an already pending retransmit request; and
if the new retransmit request would overlap the already pending retransmit request, modifying the already pending retransmit request to include the new retransmit request instead of generating the new retransmit request.

15. The method of claim 11, comprising compiling a plurality of tracking reports into a record for mapping missing second data units to first data units and determining best sources for retransmission of first data units mapped to missing second data units.

16. The method of claim 11, comprising running, on a periodic basis, queries of a database of stored delivery reports to identify missing second data units.

17. The method of claim 11, wherein:
the receptor is operable to:
extract first data units from one or more streams of first data units;
add one or more extensions to the first data units extracted from the streams of first data units;
store first data units received at the receptor for subsequent recovery operations; and
generate log files of first data units received at the receptor; and
the central comprises a data-handling node (DHN) operable to combine a plurality of streams of first data units with each other.

18. The method of claim 11, being executed outside a substantially real-time data path through the receptors and the centrals.

19. The method of claim 11, wherein a remote unit is a spacecraft.

20. Logic for data monitoring and recovery (DMR), the logic encoded in media and when executed, operable to:
generate first tracking reports of first data units received at one or more receptors from one or more remote units;
generate second tracking reports of first data units received at one of one or more centrals;
generate delivery reports of second data units extracted at the central from the first data units received at the central;
using the delivery reports, identify missing second data units that should have been received at the central, but were not;
using one or more of the tracking reports:
map the missing second data units to one or more first data units; and
determining a best source for retransmission of the first data units mapped to the missing second data units;
generate a retransmit request for the first data units mapped to the missing second data units; and
communicate the retransmit request to the best source.

21. The logic of claim 20, wherein the first data units are virtual channel data units (VCDUs) and the second data units are application packets (APs) defined in one or more Consultative Committee for Space Data Systems (CCSDS) protocols.

22. The logic of claim 20, wherein:
if a central has stored copies of the first data units mapped to the missing second data units, the best source is the central;
if no central has stored copies of the first data units mapped to the missing second data units, but a receptor does, the best source is the receptor; and
if no central and no receptor has stored copies of the first data units mapped to the missing second data units, but a remote unit does, the best source is the remote unit.

23. The logic of claim 20, wherein:
the retransmit request comprises a new retransmit request; and
the logic is operable to:
determine whether the new retransmit request would overlap or be at least substantially adjacent an already pending retransmit request; and
if the new retransmit request would overlap the already pending retransmit request, modify the already pending retransmit request to include the new retransmit request instead of generating the new retransmit request.

24. The logic of claim 20, operable to compile a plurality of tracking reports into a record for mapping missing second data units to first data units and determining best sources for retransmission of first data units mapped to missing second data units.

25. The logic of claim 20, operable to run, on a periodic basis, queries of a database of stored delivery reports to identify missing second data units.

26. The logic of claim 20, wherein:
the receptor is operable to:
extract first data units from one or more streams of first data units;
add one or more extensions to the first data units extracted from the streams of first data units;
store first data units received at the receptor for subsequent recovery operations; and
generate log files of first data units received at the receptor; and
the central comprises a data-handling node (DHN) operable to combine a plurality of streams of first data units with each other.

27. The logic of claim 20, executable outside a substantially real-time data path through the receptors and the centrals.

28. The logic of claim 20, wherein the remote unit is a spacecraft.

29. A system for data monitoring and recovery (DMR), the system comprising:
means for generating first tracking reports of first data units received at one or more receptors from one or more remote unit;
means for generating second tracking reports of first data units received at one of one or more centrals;
means for generating delivery reports of second data units extracted at the central from the first data units received at the central;
means for, using the delivery reports, identifying missing second data units that should have been received at the central, but were not;
means for, using one or more of the tracking reports:
mapping the missing second data units to one or more first data units; and
determining a best source for retransmission of the first data units mapped to the missing second data units;
means for generating a retransmit request for the first data units mapped to the missing second data units; and
means for communicating the retransmit request to the best source.

* * * * *

UNITED STATES PATENT AND TRADEMARK OFFICE
CERTIFICATE OF CORRECTION

PATENT NO.        : 7,376,077 B2                                    Page 1 of 1
APPLICATION NO.   : 10/822606
DATED             : May 20, 2008
INVENTOR(S)       : Randy C. Barnhart et al.

It is certified that error appears in the above-identified patent and that said Letters Patent is hereby corrected as shown below:

<u>Title Page, at (73) Assignee:</u>
After "Raytheon Company" please delete "Waltham, VA" and insert -- Waltham, MA --.

Signed and Sealed this

Sixth Day of January, 2009

JON W. DUDAS
*Director of the United States Patent and Trademark Office*